United States Patent [19]

Kikkawa

[11] Patent Number: 4,701,683
[45] Date of Patent: Oct. 20, 1987

[54] INVERTER CIRCUIT FOR CONVERTING DC POWER TO PULSE WAVE POWER

[75] Inventor: Yoshiro Kikkawa, Gunma, Japan

[73] Assignee: Sanyo Electric Co., Ltd., Osaka, Japan

[21] Appl. No.: 892,476

[22] Filed: Aug. 5, 1986

Related U.S. Application Data

[63] Continuation of Ser. No. 723,616, Apr. 15, 1985, abandoned.

[30] Foreign Application Priority Data

May 18, 1984 [JP] Japan ................................ 59-100849
May 18, 1984 [JP] Japan ................................ 59-73316[U]
Jun. 29, 1984 [JP] Japan ................................ 59-99029

[51] Int. Cl.$^4$ ............................................. H02K 29/08
[52] U.S. Cl. .................................... 318/254; 318/138; 318/439; 318/293
[58] Field of Search ............... 318/138, 254, 293, 439; 307/254, 255, 262, 270

[56] References Cited

U.S. PATENT DOCUMENTS

| | | | |
|---|---|---|---|
| 3,229,181 | 1/1966 | Evans | 318/293 |
| 3,402,337 | 9/1968 | Malmborg et al. | 318/254 |
| 4,135,120 | 1/1979 | Hoshimi et al. | 318/138 |
| 4,379,984 | 4/1983 | Müller | 318/138 X |
| 4,535,275 | 8/1985 | Müller | 318/254 |
| 4,535,276 | 8/1985 | Yokobori | 318/439 X |
| 4,542,323 | 9/1985 | Doemen | 318/254 |
| 4,600,864 | 7/1986 | Sato | 318/254 |

FOREIGN PATENT DOCUMENTS 3044056 6/1981 Fed. Rep. of Germany ...... 318/254
5847833 10/1980 Japan.

Primary Examiner—William M. Shoop, Jr.
Assistant Examiner—Bentsu Ro
Attorney, Agent, or Firm—Wenderoth, Lind & Ponack

[57] ABSTRACT

A pulse wave inverter circuit having two PNP transistors and two NPN transistors which are arranged such that the transistors are connected in the form of a bridge. The transistors are turned on and off so as to produce a pulse wave power. A first transistor of the four transistors is connected to a positive terminal of a D.C. power source; a second transistor is connected to a negative terminal of the D.C. power source; a third transistor, which is PNP transistor, has its emitter connected to the positive terminal of the D.C. power source; and a fourth transistor, which is NPN transistor, has its emitter connected to the negative terminal of the D.C. power source. The four transistors are turned on and off by a single switching signal which is fed to the bases of the above-described first and second transistors. This inverter circuit is suitable for driving a brushless motor.

6 Claims, 7 Drawing Figures

INVERTER CIRCUIT FOR CONVERTING DC POWER TO PULSE WAVE POWER

This application is a continuation of application Ser. No. 723,616, filed Apr. 15, 1985 and now abandoned.

BACKGROUND OF THE INVENTION

The present invention relates to a pulse wave inverter circuit apparatus for producing a pulse wave output by turning on and off four transistors which are connected in the form of a bridge by a single switching signal. The circuit in accordance with the present invention is particularly suitable for, but not limited to, a driving circuit for a brushless electric motor.

An inverter circuit is known as disclosed in Japanese Utility Model Publication No. 58-47833, published Oct. 31, 1983, in which four NPN transistors are connected in the form of a bridge circuit and the transistors are controlled on and off by a signal from a switching controller so that a pulse wave output is produced. The known circuit device as described, however, has a problem in that the transistors are separately controlled. In the known circuit, it is necessary that the switching controller produces four different switching signals for separately supplying the respective transistors. Consequently, a complex structure in the switching controller is unavoidable as well as a great number of parts and elements and, therefore, it has been difficult to miniaturize and simplify the entire structure of the inverter circuit device. Besides, the bridge circuit as disclosed in the Japanese Utility Model Publication necessitates the providing of drivers on output stages of the switching controller if each transistor is modified so as to increase its current capacity so as to control a larger output of electric current, which inevitably results in a serious problem of a further complex structure of the electric circuit.

SUMMARY OF THE INVENTION

An object of the present invention is to provide an improved inverter circuit which is simplified and miniaturized.

Another object of the present invention is to provide a new inverter circuit which permits the control of four transistors by a single switching signal, without any special switching controller.

A further object of the present invention is to provide a simplified driver circuit which can control large-capacity transistors connected to form a bridge circuit.

An additional object of the present invention is to provide a protective electric circuit which can prevent switching transistors from being overloaded or damaged when an extraordinary change or accident occurs to a load.

According to the present invention, there is provided an inverter circuit which comprises two PNP transistors and two NPN transistors used to form a bridge circuit such that two pairs of the four transistors are alternately switched from their on to off states, thereby supplying a pulse wave electric power to a load connected to the circuit.

In an embodiment of the present invention, a first transistor is connected in series to a positive terminal of a D.C. power source, and a second transistor is connected in series to a negative terminal of the D.C. power source. The output of the first transistor is connected to the output of the second transistor so as to provide a first connection. A third transistor of PNP type has its emitter connected to the positive terminal of the D.C. power source lines, and a fourth transistor of an NPN type has its emitter connected to the negative terminal of the D.C. power source. The collectors of the third and fourth transistors are connected together to provide a second connection. Thus, the ON and OFF states of the above-described four transistors is controlled by a single switching signal connected to the base circuit of the above-described first and second transistors, thereby permitting a pulse wave current to be supplied to a load connected between the first connection and the second connection. In this structure, the first transistor can be a PNP transistor and the second transistor can be an NPN transistor, and the collectors of the first and second transistor are connected together so as to provide the aforementioned first connection.

Alternatively, the first transistor can be an NPN transistor and the second transistor a PNP transistor, and the emitters of the first and second transistors are connected together so as to thereby provide the aforementioned first connection.

In the circuit described above, the load may be a stator coil of a bipolar brushless electric motor, which has a position sensor for detecting a rotational position of a rotor of the motor. A comparator may be provided so as to supply the switching signal in response to an output of the position sensor.

When the four transistors which constitute the switching portion are modified so as to have a larger current capacity, a driver circuit can simply be provided to the base circuit of one of the PNP-NPN transistor connections so that a single switching signal is applied thereto.

In an embodiment of the present invention, the inverter circuit includes a protective circuit. The protective circuit has a current detector portion for detecting an electric current to the load, and a current controller portion for limiting the electric current supplied to the load when the electric current exceeds a predetermined value. When there is something wrong with the load, as is the case in which a rotor of a brushless motor is locked, the protective circuit prevents damage of the switching portion of the inverter circuit and the load.

In another modified form of the present invention, the inverter circuit has three PNP transistors and three NPN transistors. A first transistor of a PNP type has its emitter connected to the positive terminal of the D.C. power source, a second transistor of an NPN type has its emitter connected to the negative terminal of the power source, and has its collector connected to the collector of the first transistor to provide a first connection. A third transistor of a PNP type has its emitter connected to the positive terminal of the D.C. power source, and a fourth transistor of an NPN type has its emitter connected to the negative terminal of the D.C. power source. The collector terminals of the third and fourth transistors are connected together to provide the second connection, and the third and fourth transistors have base-bias circuits connected to the first connection. In this modified structure there are a first driving transistor of a PNP type, and a second driving transistor of an NPN type and a driving resistor. The first driving transistor has its emitter connected to the positive terminal of the D.C. power source and has its collector connected to one end of the driving resistor. The driving resistor has one end connected to the first driving transistor and a base-driving circuit of the first transistor.

The second driving transistor has its emitter connected to the negative terminal of the D.C. power source. A collector of the second driving transistor is connected to the other end of the driving resistor, the other end being connected to a base-driving circuit of the second transistor. Thus, the ON/OFF states of the aforementioned three PNP transistors and three NPN transistors is controlled by a single switching signal fed to the base-bias circuits of the aforementioned first and second driving transistors, thereby permitting a pulse wave signal to be supplied to the load connected between said first connection and said second connection.

In the circuit structure with three PNP transistors and three NPN transistors described above, the first driving transistor can be an NPN transistor such that its collector is connected to the positive terminal of the D.C. power source and its emitter is connected to one end of the driving resistor, and the second driving transistor can be a PNP transistor such that its collector is connected to the negative terminal of the D.C. power source and its emitter is connected to the other end of the driving resistor, the other end being connected to a base-driving circuit of the second transistor.

PREFERRED EMBODIMENTS OF THE INVENTION

Figure 1:
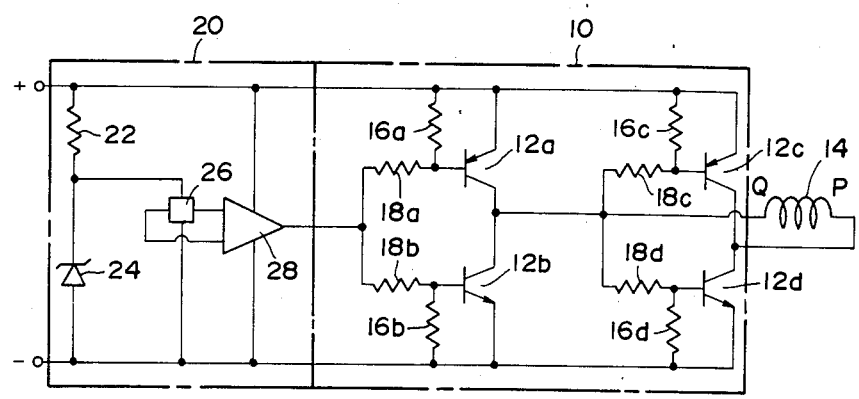
FIG. 1 is an electric circuit diagram of an inverter embodying the invention.
Figure 2:
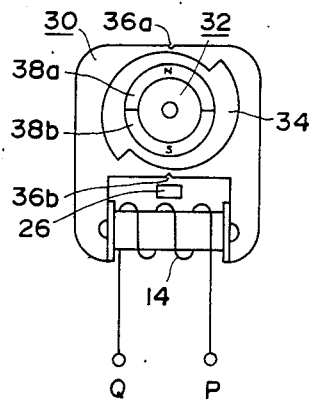
FIG. 2 is a front explanatory view of a single-phase brushless electric motor which can be a load of the electric circuit shown in FIG. 1.

Referring first to FIGS. 1 and 2, reference numeral 10 represents a switching portion which consists mainly of a first transistor 12a which is a PNP transistor, and a second transistor 12b which is an NPN transistor, and a third transistor 12c which is a PNP transistor and a fourth transistor 12d which is an NPN transistor, the transistors 12a–12d being connected in the form of a bridge. An emitter of the first transistor 12a is connected to a positive terminal (+) of a D.C. power supply, and a collector of transistor 12a is connected to a collector of the second transistor 12b, and an emitter of the second transistor 12b is connected to a negative terminal (−) of the D.C. power supply. Similarly, an emitter and a collector of the third transistor 12c are connected to the positive terminal (+) of the D.C. power supply and a collector of the fourth transistor 12d, respectively and, in addition, an emitter of the fourth transistor 12d is connected to the negative terminal (−) of the D.C. power supply.

A first transistor 12a of a PNP type has its emitter connected to the positive terminal of the DC power source and a second transistor 12b of an NPN type has its emitter connected to the negative terminal of the power source. The second transistor 12b has its collector connected to the collector of the first transistor to provide a first connection. A third transistor 12c of a PNP type has its emitted connected to the positive terminal of the DC power source, and a fourth transistor 12d of an NPN type has its emitter connected to the negative terminal of the DC power source. The third transistor 12c has its collector connected to the collector of the fourth transistor 12d to provide a second connection, and the third and fourth transistors have base-bias circuits connected to the first connection. An output of the bridge circuit as described above is taken out from the first connection and from the second connection, and then fed to a stator coil 14 of a brushless electric motor as illustrated in FIG. 2.

A base of the first transistor 12a is connected to a base bias circuit which consists of two resistors 16a and 18a. The bases of the other three transistors 12b, 12c and 12d are connected to base bias circuits consisting of resistors 16b and 18b, 16c and 18c, and 16d and 18d. The application of the bias circuits as described above ensures a reliable operation of each of the four transistors. The base resistors 18a and 18b are connected to an output terminal of the switching signal generator portion 20, and the other base resistors 18c and 18d are connected to the first connection between the first transistor 12a and the second transistor 12b.

In FIG. 1 of the drawings, reference numeral 20 is a switching signal generator portion, which has a resistor 22 and Zener diode 24 connected in series between the D.C. power supply terminals, and has a position sensor 26 such as Hall generator or Hall IC, saturated reactor, search coil, phototransistor, magnet diode, and a comparator 28 which produces, as an output, a switching signal of a rectangular-wave shape in response to an output of the position sensor 26. The position sensor 26 referred to herein is a device for detecting the rotational position of the rotor 32 of the brushless motor as illustrated in FIG. 2.

The position of the aforementioned stator coil 14 and the position sensor 26 will be understood from FIG. 2 of the drawings. The illustrated electric motor has a skeleton type stator core 30 and the rotor 32 rotatably mounted therein. The stator core 30 has a bore 34 having a configuration composed of two arcs having an equal radius and different centers which are offset from each other, and pole-separation notches 36a and 36b in an opposed relationship on the external portion of the stator core 30, which is magnetized by the stator coil 14. The rotational position sensor 26 is disposed adjacent to the pole-separation notch 36b. The rotor 32 has semicylindrical permanent magnets 38a and 38b which are magnetized into S and N polarities and rotatably secured by a bearing (not shown).

Figure 3:
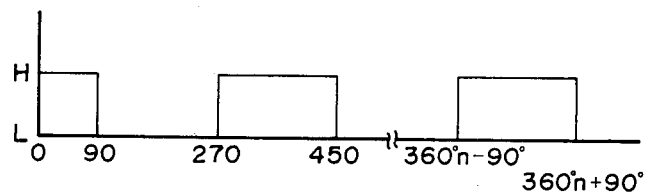
FIG. 3 is a waveform diagram of an output of a comparator in the electric circuit shown in FIG. 1.

The stator core bore 34 of two arcs provides a nonuniform air gap between the stator core 30 and the rotor 32. Accordingly, when the stator coil 14 is supplied with no power, the rotor 32 stops at a constant rotational position shown in FIG. 2 or at a position turned 180° from the position of FIG. 2. When the rotor 32 is rotated, a signal is generated from the position sensor 26 every time when a divisional portion of the magnetic polarity of the rotor passes by the position sensor 26. The output signal from the position sensor 26 is supplied to the comparator 28. In consequence, the comparator 28 produces switching signals as illustrated in FIG. 3. FIG. 3 shows a voltage level, assuming that the position at which the rotor 32 stops is represented by an electrical angle "0" and that the rotor rotates clockwise. As will be understood from FIG. 3, the voltage level is changed over from an H(high) level to an L(low) level and vice versa in accordance with every 180° rotation of the rotor 32, or in other words, in accordance with the output from the position sensor 26.

The operational mode of the electric circuit shown in FIG. 1 will be described when it is used for driving the brushless motor shown in FIG. 2. When the rotor 32 is stopped at the position illustrated in FIG. 2, the position sensor 26 detects the rotational angle thereof and the output voltage of the comparator 28 takes the H level, which is substantially equal to the voltage of the positive terminal of the D.C. power source.

When the output from the comparator 28 takes the H level, the first transistor 12a is placed in its OFF state and the second transistor 12b is placed in its ON state, and the collector voltage of the transistors 12a and 12b takes the L level. The third transistor 12c and the fourth transistor 12d are placed in the ON state and OFF state and respectively, whose base circuits are connected to the aforementioned collectors of the first and second transistors 12a, 12b. Consequently, the stator coil 14 is supplied with an electric current from the terminal P to the terminal Q and, in this state, the left and right portions of the stator core 30 as viewed in FIG. 2 constitute N and S poles, respectively. Thus, the rotor 32 starts rotation in the clockwise direction.

If the rotor 32 is then rotated 90°, the output of the comparator 28 takes the L level, and the first transistor 12a is placed in the ON state while the second transistor 12b is placed in the OFF state. Then, a connecting point of the collectors of the first and second transistors 12a, 12b takes the H level, so that the third transistor 12c takes the OFF state and the fourth transistor 12d takes the ON state. Accordingly, the stator coil 14 is supplied with an electric current from the terminal Q to the terminal P, and the rotor 32 continues to rotate clockwise due to the inertia of the rotor and the newly produced attraction and repulsion produced by the poles of the stator core 30. Thus, the rotation of the rotor is continuously maintained by the attraction and repulsion effected by the permanent magnets 38a and 38b.

Thereafter, the output voltage of the comparator 28 is successively switched over in response to the rotational angle of the rotor 32 and, at the same time, the on-off state of the first-fourth transistors 12a-12d are changed over so that the polarity of the electric power of the stator coil 14 is alternately switched over. As a result, a rotation of the rotor 32 in one direction is continuously maintained by the poles of the stator core 30 and the rotational inertia of the rotor 32.

The inverter circuit according to the present invention permits the on-off control of the four transistors by a single switching signal from the comparator. Thus, it is not necessary to dispose a special switching controller, which has been material to the conventional inverter circuit, and therefore the present invention permits a remarkable simplification of the circuit construction.

Figure 4:
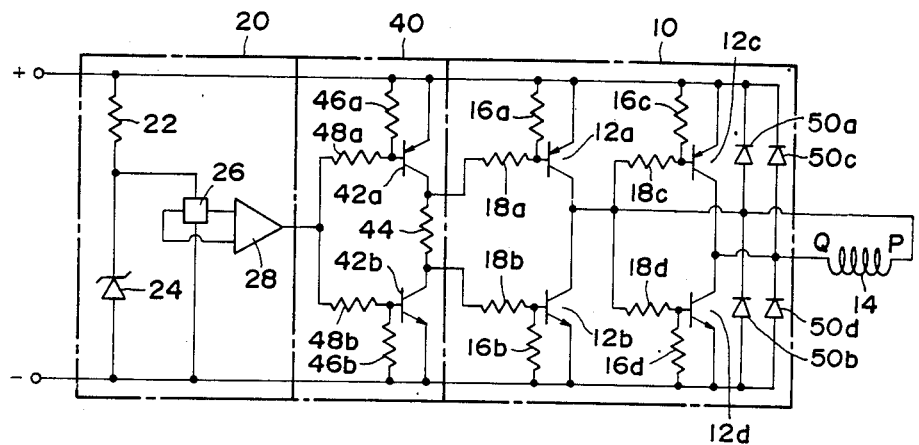
FIG. 4 is an electric circuit diagram of an inverter according to another embodiment of the present invention.

FIG. 4 shows a further embodiment of the present invention, and the circuit construction in this embodiment is suitable for supplying a relatively large electric power to a load such as the stator coil 14 of a brushless motor by modifying the bridge-connection transistors 12a-12d so as to handle a large current capacity. This electric circuit has the switching portion 10 having four transistors 12a-12d in the form of a bridge, a driver portion 40 having two transistors 42a, 42b and used for driving two of the four transistors 12a-12d, and a switching signal generator portion 20 which supplies a switching signal to the driver portion 40.

In the embodiment of FIG. 4, the switching signal generator portion 20 is quite similar to that of the previous embodiment of FIG. 1 and, accordingly, a detailed description will be omitted for the purpose of simplification only, with the same reference numerals as those of FIG. 1 being affixed to the same or similar elements. However, it is to be understood that the four transistors 12a-12d constituting the switching portion 10 are of much larger current carrying capacity than those of the previous embodiment of FIG. 1. The load in this embodiment is a brushless motor as disclosed in FIG. 2.

The feature of the electric circuit shown in FIG. 4 is that the driver portion 40 is provided between the switching portion 10 and the switching signal generator portion 20. The driver portion 40 functions to sufficiently amplify a switching signal from the switching signal generator portion 20 so as to suitably drive the switching portion 10. The driver portion 40 has a first driving transistor 42a whose emitter is connected to a positive terminal (+) of the D.C. power supply, and a driving resistor 44 having one end which is connected to a collector of the first transistor 42a and a second driving transistor 42b whose collector thereof is connected to the other end of the driving resistor 44 and whose emitter is connected to a negative terminal (−) of the D.C. power supply. In this embodiment, the first transistor is a PNP transistor and the second transistor is an NPN transistor. Base bias circuits which are composed of resistors 46a and 48a and resistors 46b and 48b are provided for transistors 42a, and 42b, respectively, and the input terminals of the base resistors 48a and 48b are connected in common.

Connection between the switching signal generator portion 20 and the driver portion 40 is achieved such that an output terminal of the comparator 28 of the switching signal generator portion 20 is connected to a connection point between the two base resistors 48a and 48b. Furthermore, connection between the driver portion 40 and the switching portion 10 is achieved in such a manner that the collector of the first driving transistor 42a is connected to the base resistor 18a of the first transistor 12a and the collector of the second driving transistor 42b is connected to the base resistor 18b of the second transistor 12b.

In the switching portion 10, the transistors 12a-12d are connected, respectively, to diodes 50a-50d, which function to discharge the stored electric charge of each transistors 12a-12d so as to protect them. This construction is especially useful for a load which is inductive as is the brushless motor in this embodiment.

The operation of the inverter circuit in FIG. 4 will be explained. In a fashion similar to that of the previous embodiment of FIG. 1, when the rotor 32 is stopped at the position shown in FIG. 2, the rotational position sensor 26 detects this rotational angle and an output of the comparator 28 takes the H level (FIG. 3). When the output voltage of the comparator 28 takes the H level, the first driving transistor 42a is placed in the OFF state and the second driving transistor 42b is placed in the ON state. Thus, electric power is fed, in turn, to the resistor 16a, base resistor 18a, driving resistor 44 and the second driving transistor 42b. The voltage of the collector of the second driving transistor 42b becomes substantially equal to that of the negative terminal (−) of the D.C. power supply and, consequently, the second transistor 12b is placed in the OFF state. The collector voltage of the first driving transistor 42a maintains a stable level which is higher than the voltage of the negative terminal of the D.C. power supply, in correspondence with the descrease in voltage of the driving resistor 44, and the first transistor 12a is placed in the ON state. The base circuits of the third and fourth transistors 12c and 12d are, in a fashion similar to that of the embodiment of FIG. 1, connected to the first connection point of the first and second transistors 12a and 12b and the connecting point of the collectors takes the H level. Consequently, the third transistor 12c takes the OFF state and the fourth transistor 12d is placed in the ON state. Thus, an electric power is supplied to the stator coil 14 from the terminal P to the terminal Q so that the left portion and the right portion of the stator core 30 as viewed in FIG. 2 of the drawings constitute N and S poles, respectively, and then the rotor 32 starts to rotate clockwise.

When the rotor 32 rotates 90°, the output voltage of the comparator 28 takes the L level, so that the first driving transistor 42a is placed in the ON state and the second driving transistor 42b is placed in the OFF state. Then, an electric power is fed in turn to the first driving transistor 42a, driving resistor 44, base resistor 18b and resistor 16b, so that the first transistor 12a is placed in the OFF state and the second transistor 12b is placed in the ON state. Therefore, the connecting point of the collectors of the transistors 12a and 12b takes the L level and, consequently, the third transistor 12c is placed in the ON state and the fourth transistor 12d is placed in the OFF state. Thus, an electric power is fed to the stator coil 14 from the terminal Q to the terminal P, and a clockwise rotation of the rotor 32 is maintained by a newly produced attraction and repulsion produced by the poles of the stator core 30 and the rotational inertia of the rotor 32.

Therefore, the output of the comparator 28 is successively changed over from the H level to the L level and vice versa in accordance with the rotational angle of the rotor 32, and the ON/OFF states of the six transistors 12a–12d, 42a and 42b are changed over so that the polarity of the electric power to the stator coil 14 is alternately switched over. Therefore, a continuous rotation of the rotor 32 is maintained by the change of polarity of the stator core 30 and a rotational inertia of the rotor 32.

In the embodiment of FIG. 4, the transistors 12c and 12d are driven by the output from the other two transistors 12a and 12b, and the latter two transistors 12a, 12b are driven by the first and second driving transistors 42a, and 42b. Therefore, the transistors 12a–12d can be driven suitably even if these transistors are power transistors of a large current carry capacity since a driving resistor 47 is provided between the collectors of the first and second driving transistors 42a and 42b and since the first and second transistors 12a and 12b are driven by a voltage across the driving resistor 44, distinctive H levels and L levels can be provided to permit a stable switching operation.

Figure 5:
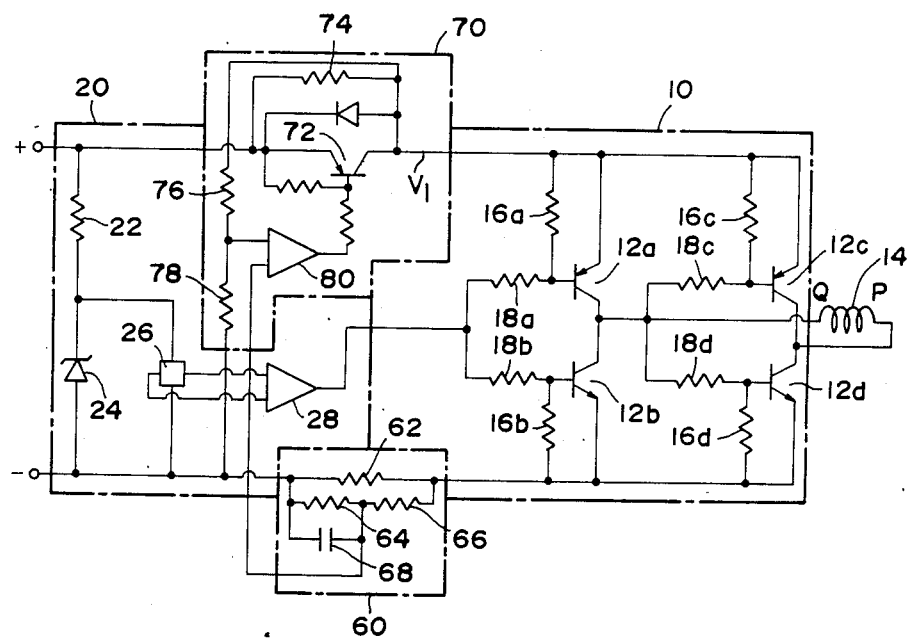
FIG. 5 is an electric circuit diagram of the single-phase inverter shown in FIG. 1 which comprises an additional protective circuit.

FIG. 5 shows a further embodiment of the invention, in which a protective circuit is included in an inverter circuit which is similar to those of FIGS. 1 and 4. This embodiment is particularly suitable for a brushless motor. Since the structure other than that of the protective circuit is substantially identical to that of FIGS. 1 and 2, the same reference numerals are affixed to the same elements and a detailed description will not be made for simplification only.

The protective circuit in the embodiment of FIG. 5 prevents the switching portion 10 and/or a load from being damaged when an extraordinary change or accident occurs to the load of the inverter circuit. The protective circuit has a current detector portion 60 for detecting an electric current to the load, that is, the stator coil 14 in this embodiment, and a current controller portion 70 which limits the power supplied to the stator coil 14 when the detected current of the current detector portion 60 exceeds a predetermined value.

The current detector portion 60 consists of a series resistor 62 for detecting an electric current fed to a principal circuit, and potential-divided resistors 64 and 66 which divide the voltage across the terminals, of resistor 62 and a capacitor 68 connected in parallel with the resistor 64.

The current controller portion 70 has a power transistor 72 which supplies an electric power to the switching portion 10, a return resistor 74, two resistors 76 and 78 which are connected to the D.C. power supply so as to determine a value for starting a protective operational mode along with the protective return resistor 74, and a second comparator 80 which forces the power transistor 72 to be placed in the OFF state when the detected output of the detector portion 60 exceeds the above-described value.

When an external force is added to the rotor 32 to lock it while the brushless motor is in operation, an excessive current flows successively to the stator coil 14 in one direction only to produce a large output voltage at the current detector portion 60. If this output voltage exceeds the predetermined value which is determined by the return resistor 74 and the resistors 76 and 78, an output voltage of the second comparator 80 takes the H level. Thus, the power transistor 72 is placed in the OFF state to cut off a current flow to the switching portion 10 and the stator coil 14. At this time, the H level voltage of the second comparator 80 is set to be lower than a voltage which turns-off the power transistor so that the power transistor 72 is not placed in a completely OFF state. When an electric charge of the capacitor 68 is discharged, the output of the second comparator 80 takes the L level to place the transistor 72 in the ON state, and an electric current is fed again to the switching portion 10 and the stator coil 14.

Figure 6:
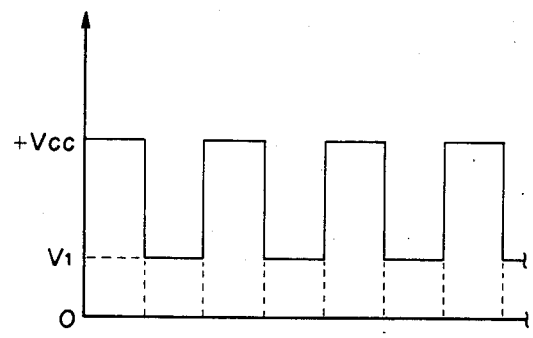
FIG. 6 is a waveform diagram of the voltage fed to the load at the operational time of the protective circuit shown in FIG. 5.

If the rotor 32 is still locked thereafter, the output voltage of the current detector portion 60 becomes large again and, consequently, the output voltage of the second comparator 80 takes the H level. Thus, the transistor 72 is placed in the OFF state to cut off the electric current to the switching portion 10 and the stator coil 14. During the time when the rotor 32 is locked, an electric voltage having an amplitude between the D.C. power supply voltage (+Vcc) and the voltage $V_1$ of the transistor 72 in the OFF state as shown in FIG. 6 is fed to the switching portion 10 and the stator coil 14, wherein $+Vcc > V_1 > 0$.

In the embodiment of FIG. 5, the inverter circuit has a current detector portion 60 which detects an electric current of the stator coil 14, and a current control portion 70 which limits the electric power to the stator coil 14 when the current detected by the current detector portion 60 exceeds the predetermined value. This prevents an excessive current from flowing to the switching portion 10 and the stator coil 14 when the rotor 32 is accidentally placed into a locked state during operation of the motor, and also prevents damage to the transistors 12a-12d and the stator coil 14. Furthermore, a voltage fluctuation (+Vcc−V₁) to the stator coil 14 is small relative to that of the conventional construction and, as a result, a rapid change of a rotational magnetic field is limited to thereby protect the motor from torsional fatigue of the rotational portions thereof.

Figure 7:
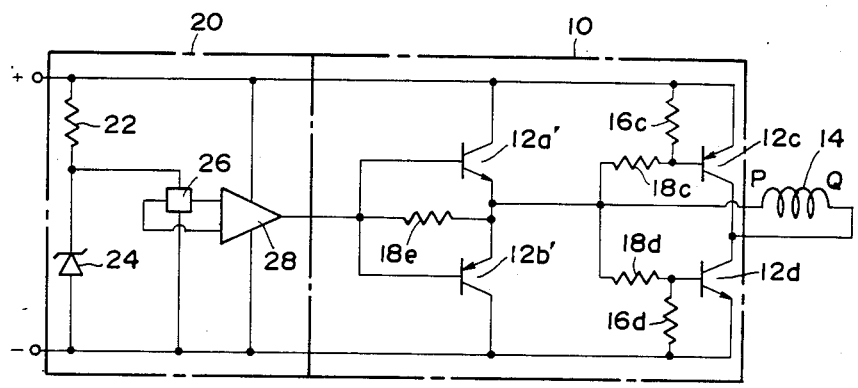
FIG. 7 is an electric circuit diagram of an inverter according to another embodiment of the invention.

FIG. 7 shows a modified structure of the inverter circuit which has been described with reference to FIG. 1. In the embodiment of FIG. 7, a first transistor 12a' is an NPN transistor, and a second transistor 126' is a PNP transistor. A collector of the first transistor 12a' is connected to a positive terminal (+) of D.C. power supply, and an emitter of transistor 12a' is connected to an emitter of the second transistor 12b'. A collector of the second transistor 12b' is connected to a negative terminal (−) of the D.C. power supply.

An emitter and a collector of a third transistor 12c, which is a PNP transistor, are connected to the positive terminal (+) of the power supply and a collector of a fourth transistor 12d, which is an NPN transistor, respectively and, in addition, an emitter of the fourth transistor 12d is connected to the negative terminal (−) of the power supply in a fashion similar to that of the structure illustrated in FIG. 1. An ouput of the thus formed bridge circuit is taken out from a first connection between the emitters of the first and second transistors 12a' and 12b', and from a second connection between the collectors of the third and fourth transistors 12c and 12d, and then fed to the stator coil 14 such as a load of the brushless electric motor shown in FIG. 2.

A base of the first transistor 12a' is connected to a base of the second transistor 12b', and the first connection between the emitters of the first and second transistors is connected to the connection between the bases of the first and second transistors 12a' and 12b' through a resistor 18e.

The operation of the circuit of FIG. 7 will be described. When the output from the comparator 28 takes the H level, the first transistor 12a' an NPN type is placed in the ON state and the fourth transistor 12d of NPN type takes ON state, and an electric current flows from the terminal P to the terminal Q. When the output of the comparator 28 takes the L level, the second transistor 12b' of a PNP type and the third transistor of a PNP type are placed in the ON state, and an electric current flows from the terminal Q to the terminal P.

Other structural features and operational mode of the inverter circuit shown in FIG. 7 will be understood from the previous description which has been made with reference to FIGS. 1 to 3, and a further detailed description will not be made.

Whereas the invention has been disclosed with reference to the particular embodiments, the same is not to be considered as limited to these embodiments, but its scope extends to the obvious changes and modifications that will be evident to those skilled in the art.

What is claimed is:

1. An inverter circuit for controlling a brushless electric motor which has a permanent magnet rotor, a single stator coil and a position sensor for detecting a rotational position of said rotor and for providing an electrical output which is either High or Low, and having two PNP transistors and two NPN transistors for supplying an electric current to said electric motor, wherein said inverter circuit comprises:
   a first transistor of an NPN type, having a collector connected to a positive terminal of a DC power source and having a base connected to said position sensor;
   a second transistor of a PNP type, having a collector connected to a negative terminal of said DC power source and having a base connected to said position sensor;
   wherein said first transistor has an emitter connected to an emitter of said second transistor so as to provide a first connection;
   a resistor connected between said position sensor and said first connection;
   a third transistor of said PNP type, having an emitter connected to said positive terminal of said DC power source and having a base bias resistor connected between a base thereof and said first connection;
   a fourth transistor of said NPN type, having an emitter connected to said negative terminal of said DC power source and having a base bias resistor connected between a base thereof and said first connection;
   wherein said third transistor has a collector connected to a collector of said fourth transistor so as to provide a second connection; said stator coil being connected between said first connection and said second connection,
   wherein said first through fourth transistors are a first state when said output of said position sensor is Low, and are in a second state when said output of said position sensor is High; said second and third transistors being in an ON state and said first and fourth transistors being in an OFF state when said first through fourth transistors are in said first state; and said first and fourth transistors being in an ON state and said second and third transistors being in an OFF state when said first through fourth transistors are in said second state such that said ON/-OFF states of said first through fourth transistors are changed from said first state to said second state, or from said second state to said first state in accordance with said output of said position sensor, whereby electric current supplied to said stator coil is alternately supplied from said first connection to said second connection and from said second connection to said first connection in dependance upon said ON/OFF states of said first through fourth transistors.

2. An inverter circuit according to claim 1, further comprising:
   a current detector means for detecting an electric current fed to said stator coil, and
   a current controller means for limiting a flow of electric current to said stator coil when a detected electric current by said current detector means exceeds a predetermined value.

3. An inverter circuit according to claim 1, further comprising between said position sensor and said bases of said first and second transistors:
   a first driving transistors of said NPN type, having an emitter connected to said positive terminal of said DC power source and having a base connected through a resistor to said position sensor, and having a collector connected to one end of a driving resistor;
   a second driving transistor of said PNP type, having an emitter connected to said negative terminal of said DC power source and having a base connected through a resistor to said position sensor, and having a collector connected to another end of said driving resistor;

wherein one end of said driving resistor is connected through said base bias resistor of said first transistor to said base of said first transistor, and said another end of said driving resistor is connected through said base bias resistor of said second transistor to said base of said second transistor; and wherein said ON/OFF state of each of said first through fourth transistors is controlled by a single switching signal supplied to said base resistors of said first and second transistors, thereby causing electric power to be supplied to said stator coil.

4. An inverter circuit according to claim 1, further comprising a comparator for supplying switching signals for controlling ON/OFF states of said first through fourth transistors in response to the output of said position sensor.

5. An inverter circuit for controlling a brushless electric motor which has a permanent magnet rotor, a single stator coil and a position sensor for detecting a rotational position of said rotor and for providing an electrical output which is either High or Low, and having two PNP transistors and two NPN transistors for supplying an electric current to said electric motor, wherein said inverter circuit comprises:

a first transistor of a PNP type, having an emitter connected to a positive terminal of a DC power source, and having a base bias resistor connected between a base thereof and said position sensor;

a second transistor of an NPN type, having an emitter connected to a negative terminal of said DC power source and having a base bias resistor connected between a base thereof and said position sensor;

wherein said first transistor has a collector connected to a collector of said second transistor so as to provide a first connection;

a third transistor of said PNP type, having an emitter connected to said positive terminal of said DC power source and having a base bias resistor connected between a base thereof and said first connection;

a fourth transistor of said NPN type, having an emitter connected to said negative terminal of said DC power source and having a base bias resistor connected between a base thereof and said first connection;

wherein said third transistor has a collector connected to a collector of said fourth transistor so as to provide a second connection; said stator coil being connected between said first connection and said second connection;

and wherein said first through fourth transistors are in a first state when said output of said position sensor is Low, and are in a second state when said output of said position sensor is High; said first and fourth transistors being in an ON state and said second and third transistors being in an OFF state when said first through fourth transistors are in said first state; and said first and fourth transistors being in an OFF state and said second and third transistors being in an ON state when said first through fourth transistors are in said second state such that said ON/OFF states of said first through fourth transistors are changed from said first state to said second state, or from said second state to said first state in accordance with said output of said position sensor, whereby electric current supplied to said stator coil is alternately supplied from said first connection to said second connection and from said second connection to said first connection in dependence upon said ON/OFF states of said first through fourth transistors;

said inverter circuit further comprises a current controller means, wherein said current controller means has a power transistor, connected in series to a principle circuit portion of said apparatus, for controlling an electric current so that a limited amount of electric power is supplied to said stator coil when an excessive current is detected.

6. An inverter circuit for controlling a brushless electric motor which has a permanent magnet rotor, a single stator coil and a position sensor for detecting a rotational position of said rotor and for providing an electrical output which is either High or Low, and having two PNP transistors and two NPN transistors for supplying an electric current to said electric motor, wherein said inverter circuit comprises:

a first transistor of a PNP type, having an emitter connected to a positive terminal of a DC power source, and having a base bias resistor connected between a base thereof and said position sensor;

a second transistor of an NPN type, having an emitter connected to a negative terminal of said DC power source and having a base bias resistor connected between a base thereof and said position sensor;

wherein said first transistor has a collector connected to a collector of said second transistor so as to provide a first connection;

a third transistor of said PNP type, having an emitter connected to said positive terminal of said DC power source and having a base bias resistor connected between a base thereof and said first connection;

a fourth transistor of said NPN type, having an emitter connected to said negative terminal of said DC power source and having a base bias resistor connected between a base thereof and said first connection;

wherein said third transistor has a collector connected to a collector of said fourth transistor so as to provide a second connection; said stator coil being connected between said first connection and said second connection;

and wherein said first through fourth transistors are in a first state when said output of said position sensor is Low, and are in a second state when said output of said position sensor is High; said first and fourth transistors being in an ON state and said second and third transistors being in an OFF state when said first through fourth transistors are in said first state; and said first and fourth transistors being in an OFF state and said second and third transistors being in an ON state when said first through fourth transistors are in said second state such that said ON/OFF states of said first through fourth transistors are changed from said first state to said second state, or from said second state to said first state in accordance with said output of said position sensor, whereby electric current supplied to said stator coil is alternately supplied from said first connection to said second connection and from said second connection to said first connection in dependence upon said ON/OFF states of said first through fourth transistors;

further comprising between said position sensor and said bases of said first and second transistors:

a first driving transistor of said PNP type, having an emitter connected to said positive terminal of said DC power source and having a base connected through a resistor to said position sensor, and having a collector connected to one end of a driving resistor;

a second driving transistors of said NPN type, having an emitter connected to said negative terminal of said DC power source and having a base connected through a resistor to said position sensor, and having a collector connected to another end of said driving resistor;

wherein one end of said driving resistor is connected through said base bias resistor of said first transistor to said base of said first transistor, and another end of said driving resistor is connected through said base bias resistor of said second transistors to said base of said second transistor; and wherein said ON/OFF state of each of said first through fourth transistors is controlled by a single switching signal which is supplied to said bases of said first and second driving transistors, thereby causing electric power to be supplied to said stator coil.

* * * * *